US007712583B2

(12) United States Patent
Matsumoto

(10) Patent No.: US 7,712,583 B2
(45) Date of Patent: May 11, 2010

(54) METHOD AND APPARATUS FOR CONTROLLING AUTOMATIC LIFTING AND LOWERING TYPE PLATFORM

(75) Inventor: Kesafumi Matsumoto, Atsugi (JP)

(73) Assignee: Kouken Company, Limited, Kanagawa (JP)

( * ) Notice: Subject to any disclaimer, the term of this patent is extended or adjusted under 35 U.S.C. 154(b) by 1021 days.

(21) Appl. No.: 11/233,328

(22) Filed: Sep. 22, 2005

(65) Prior Publication Data

US 2006/0102432 A1 May 18, 2006

(30) Foreign Application Priority Data

Oct. 18, 2004 (JP) ............................ 2004-302945

(51) Int. Cl.
*B60P 1/64* (2006.01)
*B66F 11/04* (2006.01)
*B66C 15/06* (2006.01)

(52) U.S. Cl. ....................... 187/250; 187/224; 187/233; 414/347; 414/495; 212/276

(58) Field of Classification Search ................. 187/224, 187/226, 227, 233, 249, 250; 414/495, 498, 414/347, 458, 909; 212/276, 278
See application file for complete search history.

(56) References Cited

U.S. PATENT DOCUMENTS 3,680,714 A * 8/1972 Holmes ...................... 212/277
3,749,363 A * 7/1973 Hauser ....................... 414/498
4,763,800 A * 8/1988 Engler et al. ................ 212/195
5,417,540 A * 5/1995 Cox ........................... 414/495
5,813,551 A * 9/1998 Abel .......................... 212/278
6,071,062 A * 6/2000 Warhurst et al. ............ 414/498
6,546,312 B1 * 4/2003 Matsumoto ................. 414/498
6,634,461 B1 * 10/2003 Baker ......................... 187/247
7,014,012 B2 * 3/2006 Baker ......................... 187/247
2001/0032032 A1 * 10/2001 Matsumoto ................. 700/213
2008/0165926 A1 * 7/2008 Kotowski et al. .............. 378/57

FOREIGN PATENT DOCUMENTS

JP 11-171477 6/1999
JP 2000-134729 5/2000
JP 2001-315890 11/2001
JP 2002-053296 2/2002

* cited by examiner

*Primary Examiner*—Walter Benson
*Assistant Examiner*—Eduardo Colon-Santana
(74) *Attorney, Agent, or Firm*—Jordan and Hamburg LLP

(57) ABSTRACT

Disclosed is a method and apparatus for controlling automatic lifting and lowering type platform that can correct the inclination of a mobile power generator and that can always maintain the level while carrying out automatic lifting and lowering of the generator. The apparatus includes vertical outer cases which are extended or withdrawn in the horizontal directions from or into both sides at both ends of the chassis α; vertical inner cases which are inserted into the vertical outer cases and extended or withdrawn in the vertical directions; and an allotter which allots output to jacks so that inclination detected by an angle sensor can always be corrected.

8 Claims, 11 Drawing Sheets

METHOD AND APPARATUS FOR CONTROLLING AUTOMATIC LIFTING AND LOWERING TYPE PLATFORM

BACKGROUND OF THE INVENTION

1. Field of the Invention

The present invention relates to an automatic lifting and lowering controlling method that serves in installation of a heavy machine, such as a mobile power generating apparatus, or the like, on or removal thereof from a desired site, and an automatic lift/lower type platform controlling apparatus which is to be directly used for implementing the method.

2. Description of the Related Art

Conventionally, installation of a mobile power generating apparatus, or the like, on or removal thereof from a desired site has been performed by using a mobile large-sized crane, or the like, and the lashing crew therearound handling slings and other materials for load lashing.

However, loading and unloading of a mobile power generating apparatus, or the like, with a crane and by lashing work has presented a number of problems, such as that the operator of a crane is limited to the qualified personnel; that, if the crane used is large-sized, a wide working area is required to be secured, and that there is a hazard to the crew by a possible drop of load during operation of the crane, and the possibility of the load being damaged by dropping.

By the way, for the mobile power generating apparatus, it has been a general practice that the power generator is accommodated in a bonnet type (box type) container for reinforcement, and protection against outdoor weather, and minimization of the noise from the power generator; that the loading and unloading is performed by a crane to suspend the platform (also called chassis, bed, or base), on which the container is loaded, at the four side points thereof; and that, as the frame structural material on both sides of the platform, a channel steel material is used to provide a necessary strength.

In order to solve the above-mentioned problems, an automatic lifting/lowering platform apparatus A', as shown in FIG. 10, which eliminates the need for lashing work, has been developed, allowing reduction of size of the mobile power generating apparatus; loading and unloading by a small number of crew members who are not limited to the qualified personnel, and thus reduction in the necessary numbers of working crew members; elimination of the hazard to the crew by a possible drop of load during operation of the crane, and the possibility of the load being damaged by dropping; and reduction of the working area required for transfer to or from the installation site.

Utilization of the automatic lifting/lowering platform apparatus A' having the above-mentioned advantages has improved the safety and ease of the loading and unloading work, and reduced the cost.

Further, in the patent literature 1 as given below, the method for automatic lifting/lowering of a mobile power generating apparatus by utilizing the extending and contracting ability of the jacks in the automatic lifting/lowering platform apparatus A', and the operator wirelessly operating a remote control operating apparatus for lifting/lowering the mobile power generating apparatus is disclosed.

Patent literature 1: Japanese Laid-Open Publication No. 2000-134729

However, the automatic lifting/lowering platform apparatus A' as disclosed in the patent literature 1 has presented such problems as that, due to the difference in distance from the single pressure source to the respective jacks as automatic lifting and lowering means, the pressure loss and the pressure transfer rate vary, resulting in differences in operation timing and operation speed between jacks, and thus the vertical positions of the respective jacks vary, which can cause an inclination to be generated in automatic lifting or automatic lowering of the power generator, and thus a strain or a torsion to be produced, resulting in the joint waterproofing material on the outer plate panel being peeled off, which may lead to rainwater entering the interior and the door becoming impossible to be opened.

In addition, there has been a big problem that, if, as the frame structural material $\alpha'$ for the chassis $\alpha'$ in the automatic lifting/lowering platform apparatus A', the above-mentioned channel steel material is used, and for further reinforcement, an upper part structural material (a-H frame) and five-face outer plates and a bottom plate as shown in FIG. 8 (*a*), are provided, those materials may interfere with some component parts of the power generator, with the bottom plate having such a maintenability ill effect as that the oil pan cannot be removed, and in order to avoid these possible issues, the automatic lifting/lowering platform apparatus A' has to be increased in size, which results in an increase in the weight as opposed to the lightweight which is required of the automatic lifting/lowering platform apparatus for mobile power generating apparatus.

The cause for the above-mentioned problems originate from that, as shown in FIG. 9 (*a*) and FIG. 9 (*b*), the form of stress has been changed from that for the four-point suspension by the crane (see FIG. 9 (*a*)) to that for the support by the four jacks in the outriggers $\beta'$ in the platform mechanism part of the automatic lifting/lowering platform apparatus A' (see FIG. 9 (*b*)). Further, with the jacks in the automatic lifting/lowering platform apparatus A', a phenomenon of two-point support on the diagonal line across the points X+ and X−, or Y+ and Y−, is occasionally caused. With the four-point suspension by the crane, the load imposed on one point by the suspension is approx. ¼ of the total weight, and the loading angle with respect to the vertical is equal for all the four. On the other hand, with the support by the four jacks, when the two-point support phenomenon is caused, the load supported by one jack is increased from ¼ to ½ of the total weight, i.e., doubled. In addition, the lifted sides of the structure hang down, and the direction of stress is alternately inverted. The member between Y+ and −X, and that between X+ and Y− are twisted to an extent which depends upon the load they bear. As a result of this torsion, a tension which has not been encountered in the suspension is applied to the top, bottom, and side outer plates. Such tension is transferred to the vibration absorbing rubber mounts and the outer plate panels, and the repetition of application of the tension has also caused the above-mentioned problems.

In addition, the hydraulic circuit open-close shock load occurring in the solenoid directional control valves for the jacks incorporated in the outriggers $\beta'$ in the automatic lifting/lowering platform apparatus A' has further increased the above-mentioned torsion of the chassis $\alpha'$, although this phenomenon was a transient one. Such hydraulic circuit open-close shock load was heavily generated when, in lowering, the contracting motion of the jack which caused the power generating apparatus to be greatly inclined was stopped.

Either the crane for loading and unloading or the automatic lifting/lowering platform apparatus A' is driven on hydraulic power, but these differ from each other in the mechanism of occurrence and transfer of a shock caused by a hydraulic open-close valve. With the crane for loading and unloading, the shock is alleviated by the deflection of the long beams and the extension and contraction of the wires, but with the automatic lifting/lowering platform apparatus A', there are no portions which can alleviate the shock, and thus the chassis is directly subjected to deflection and torsion, which can lead to occurrence of problems.

The inclination of the entire power generating apparatus can be easily verified at a location distant to some degree therefrom, however, the system with which the solenoid directional control valves are directly operated near the machine, the angle of the inclination cannot easily be recognized (the tardiness of angle recognition), which, in some cases, has led to an unnecessary inclination, and increased the shock load. The tardiness of angle recognition involved in the operation near the machine might cause overturning of the machine, resulting in the operator himself being injured by the overturned machine, thus with this system, the operator must have had to repeat a slight adjustment, and “a patrol around and inspection of the entire machine”.

SUMMARY OF THE INVENTION

The present invention has been made in view of the above circumstances, and the major purposes of the present invention are as follows.

A first purpose of the present invention is to provide an automatic lifting and lowering controlling method and an automatic lift/lower type platform controlling apparatus for mobile power generating apparatus, or the like, that, in an automatic lifting/lowering operation on a mobile power generating apparatus, or the like, generate no strain and torsion which may cause failure or trouble of the apparatus.

A second purpose of the present invention is to provide an automatic lifting and lowering controlling method and an automatic lift/lower type platform controlling apparatus for mobile power generating apparatus, or the like, that can be reinforced against possible failure and vibration, while being lightweight.

A third purpose of the present invention is to provide an automatic lifting and lowering controlling method and an automatic lift/lower type platform controlling apparatus for mobile power generating apparatus, or the like, that correct the inclination which may cause a strain or torsion, and that can always maintain the level while carrying out automatic lifting and lowering of the mobile power generating apparatus.

A fourth purpose of the present invention is to provide an automatic lifting and lowering controlling method and an automatic lift/lower type platform controlling apparatus for mobile power generating apparatus, or the like, that can be used and operated by any personnel, and that allow safely carrying out of automatic lifting/lowering of a mobile power generating apparatus, or the like.

The other purposes of the present invention will be clear of themselves from the specification, the drawings, and particularly from the respective claims as given in the accompanying “What is claimed is:”.

In order to solve the above-mentioned purposes of the present invention, the apparatus of the present invention provides means of an automatic lift/lower type platform controlling apparatus comprising a chassis which is integrally formed with a mobile power generating apparatus, or the like, or on which a mobile power generating apparatus, or the like, is to be loaded for serving a desired purpose on a desired site; outriggers which are extended or drawn in in the horizontal direction from or into both sides at both ends of the chassis, incorporating a jack, respectively; a vertical outer case in the outriggers; a vertical inner case which is inserted into the vertical outer case, and extended or drawn in in the vertical direction; an angle sensor for inclination correction that detects the inclination in the front, rear, right, and left directions of said chassis; an allotter which causes the deviations detected by the angle sensor to be reflected to said respective jacks; and a remote wireless control operating apparatus for wirelessly operating from the outside.

In addition, the method of the present invention provides an automatic lifting and lowering controlling method for mobile power generating apparatus, or the like, wherein wireless starting/switching-over of automatic lifting and automatic lowering is performed by remote control, while the inclination of the mobile power generating apparatus, or the like, which is loaded on or integrated with the chassis is automatically detected to provide automatic level adjustment of the respective outriggers mounted to the chassis for maintaining the levelness while carrying out automatic lifting or automatic lowering.

More particularly, in order to solve the problems, the present invention adopts novel characteristic configuration methods and means listed below that range from the high order of concept to the low order thereof for achieving said purposes.

A first aspect of the present invention is configured to provide an automatic lifting and lowering controlling method for mobile power generating apparatus, or the like, wherein, in an automatic lifting/lowering operation for installation or removal of a mobile power generating apparatus, or the like, on or from a desired site, an automatic lift/lower type platform controlling apparatus on which the mobile power generating apparatus, or the like, is loaded, or which incorporates the mobile power generating apparatus, or the like, in the automatic lift/lower type platform controlling apparatus itself has a plurality of automatic lifting and lowering means, and when, during the operation of the automatic lifting and lowering means, the inclination of said mobile power generating apparatus, or the like, is detected by automatic leveler means provided thereon, the operation of the respective automatic lifting and lowering means is automatically adjusted to keep the mobile power generating apparatus, or the like, level, while the mobile power generating apparatus, or the like, being automatically lifted or automatically lowered to a desired level; on the other hand, in starting/switching-over operation for automatic lifting or automatic lowering of the mobile power generating apparatus, or the like, all of said plurality of automatic lifting and lowering means are collectively wirelessly remote controlled.

A second aspect of the present invention is configured to provide the automatic lifting and lowering controlling method for mobile power generating apparatus, or the like, of the first aspect, wherein said automatic lifting and lowering means performs said automatic lifting/lowering operation, a torque tube being used as a frame structural material for a chassis in which the automatic lifting and lowering means is mounted in order to increase the torsion strength and the strain strength without the need for increasing the weight of reinforcement, and eliminate the problems arising from an inclination torsion or strain caused by a deviation in operation timing and speed between said respective automatic lifting and lowering means.

A third aspect of the present invention is configured to provide the automatic lifting and lowering controlling method for mobile power generating apparatus, or the like, of the first aspect or the second aspect, wherein said automatic leveler means essentially consists of a combination of an angle sensor for inclination correction, and an allotter for receiving a signal from the angle sensor to make ON/OFF control of the automatic lifting and lowering means for level adjustment operation, and as soon as the angle sensor detects that particular automatic lifting and lowering means or a particular set of automatic lifting and lowering means produces a deviation of true level that exceeds an allowable limit, stops the particular automatic lifting and lowering means, adjusting the operation of the other automatic lifting and lowering means or the particular set of automatic lifting and lowering means for restoring the levelness of said automatic lift/lower type platform controlling apparatus, then resuming the automatic lifting of automatic lowering.

A fourth aspect of the present invention is configured to provide the automatic lifting and lowering controlling method for mobile power generating apparatus, or the like, of the third aspect, wherein said automatic leveler means introduces open-close signals for the four points, right and left and front and rear, corresponding to said respective automatic lifting and lowering means into the allotter, and by causing said respective automatic lifting and lowering means to follow the control for level adjustment, automatically carries out the level correction of the inclination of said torque tube chassis in the diagonal directions and at the four sides thereof safely and with a minimum of shock in automatic lifting or automatic lowering.

A fifth aspect of the present invention is configured to provide the automatic lifting and lowering controlling method for mobile power generating apparatus, or the like, of the first aspect, the second aspect, the third aspect, or the fourth aspect, wherein said automatic lifting and lowering means is wirelessly controlled by the operator using a wireless control apparatus to select any one of the two channels for lifting or lowering.

A sixth aspect of the present invention is configured to provide an automatic lift/lower type platform controlling apparatus for mobile power generating apparatus, or the like, wherein the automatic lift/lower type platform controlling apparatus is an apparatus for carrying out an automatic lifting/lowering operation for installation or removal of a mobile power generating apparatus, or the like, on or from a desired site, comprising: a chassis which is a platform on which the mobile power generating apparatus, or the like, is to be loaded or which is integrated with the mobile power generating apparatus, or the like; a plurality of outriggers which are mounted on both sides of the chassis so as to be extended or drawn in in the horizontal direction in lifting or lowering operation; an automatic leveler for automatically detecting the inclination of said mobile power generating apparatus, or the like, in the front, rear, right, or left direction; directional control/open-close valves provided in parallel pressure circuits for supply and return that connect between a single pressure source and the hydraulic cylinder in said respective outriggers for allowing selection of either supply or return circuit, and performing open-close operation on the level adjustment ON/OFF operation signal from said automatic leveler that corresponds to the respective outriggers.

A seventh aspect of the present invention is configured to provide the automatic lift/lower type platform controlling apparatus for mobile power generating apparatus, or the like, of the sixth aspect, wherein said automatic leveler essentially consists of: a square angle sensor which is to be disposed at the center of the bottom of said mobile power generating apparatus, or the like, with the four corners being oriented to the front, rear, right, and left directions of the mobile power generating apparatus, or the like, respectively, and issuing inclination signals corresponding to said outriggers, respectively; and an allotter which receives the respective inclination signals from the angle sensor, and automatically allots a level adjustment ON/OFF operation signal to said respective directional control/open-close valves connected to the jacks incorporated in the outriggers, respectively.

An eighth aspect of the present invention is configured to provide the automatic lift/lower type platform controlling apparatus for mobile power generating apparatus, or the like, of the sixth aspect or the seventh aspect, wherein, for said chassis, a torque tube which is resistant to a torsion or strain generated in automatic lifting/lowering is adopted as a frame structural material.

A ninth aspect of the present invention is configured to provide the automatic lift/lower type platform controlling apparatus for mobile power generating apparatus, or the like, of the seventh aspect or the eighth aspect, wherein said allotter is functionally configured to issue a lifting/lowering command signal to said all directional control/open-close valves, being connected to a wireless control apparatus for selecting either of the two directions of lifting and lowering to operation-control said all jacks.

A tenth aspect of the present invention is configured to provide the automatic lift/lower type platform controlling apparatus for mobile power generating apparatus, or the like, of the ninth aspect, wherein said wireless control apparatus essentially consists of a combination of a transmitter having lifting and lowering two-channel operation switches and a receiver which receives a single channel signal from the transmitter to transmit either of the lifting and lowering signals to said allotter.

According to the present invention, use of a torque tube for reinforcement of the chassis allows the automatic lift/lower type platform controlling apparatus to be reinforced without the need for increasing the size, and eliminates the possible problems that some component parts of the mobile power generating apparatus may be subjected to a deformation pressure by a container wall plate or the platform, and that the maintenability may be adversely affected.

Further, the inclination correction by the automatic leveler in the apparatus of the present invention allows carrying out automatic lifting and automatic lowering of the mobile power generating apparatus while maintaining the level in installation and removal of the mobile power generating apparatus, and by using the angle sensor for automatically performing the inclination correction, the possible problems that dropping, overturning, failure, and the like, of the mobile power generating apparatus may occur can be eliminated, with the safety of the crew members being assured.

In addition, by adopting a wireless remote control apparatus for starting/switching-over of the two operations of automatic lifting and lowering to limit the switch operation to only the two directions of lifting and lowering, automatic lifting/lowering operation can be carried out easily and smoothly, with the situation of the automatic lifting/lowering operation being grasped by the crew member who is also capable of paying attention to the safety of himself.

BRIEF DESCRIPTION OF THE DRAWINGS

FIG. 7 (*b*) is a back view of the mobile power generating apparatus loaded on the automatic lift/lower type platform controlling apparatus;

FIG. 10 is a perspective side view of the automatic lifting/lowering platform mechanism part of the conventional automatic lift/lower type platform controlling apparatus for loading a mobile power generating apparatus, or the like.

BEST MODE FOR CARRYING OUT THE INVENTION

Hereinbelow, an example of apparatus and an example of method corresponding thereto which are embodiments of the present invention will be described.

(Example of Apparatus)

Figure 1:
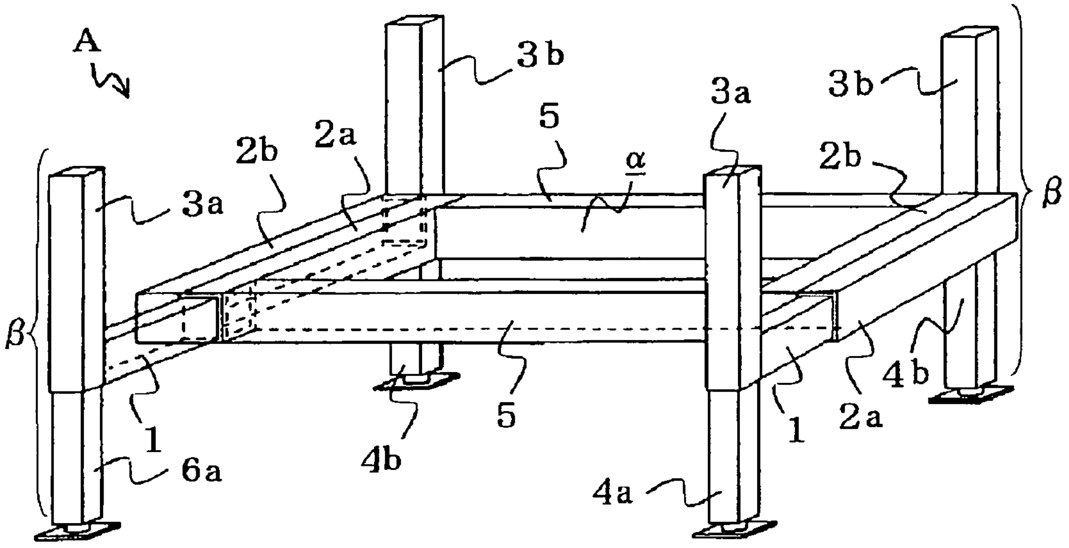
FIG. 1 is a perspective side view illustrating the configuration of the automatic lifting/lowering platform mechanism part of the automatic lift/lower type platform controlling apparatus for mobile power generating apparatus, or the like, that pertains to an example of apparatus of the present invention.

The present example of apparatus will be described with reference to FIG. 1. FIG. 1 is a configuration drawing illustrating the automatic lifting/lowering platform mechanism part of an automatic lift/lower type platform controlling apparatus which is the present example of apparatus.

A chassis α in the automatic lifting/lowering platform mechanism part of the present example of apparatus comprises a set of outriggers β consisting of a pair of outrigger beams 1, front and rear, which are repositioned in the horizontal direction before and after the automatic lifting/lowering operation; two pairs of outrigger beam boxes 2*a*, 2*b*, front and rear, for drawing in the outrigger beams 1; two pairs of right and left vertical outer cases 3*a*, 3*b*, front and rear, for performing automatic lifting/lowering operation in the vertical direction; and two pairs of vertical inner cases 4*a*, 4*b*, front and rear, which are drawn in into or extended from the vertical outer cases 3*a*, 3*b*, and incorporating a jack, respectively; and a set of torque tubes 5 provided as both-side frame structural materials for the flat rectangular chassis α to bear the torsion moment, constituting the automatic lifting/lowering platform mechanism part of the automatic lift/lower type platform controlling apparatus A for freely loading a mobile power generating apparatus B, or the like, or that is integrated therewith.

The frame structural materials αa' on both sides of the chassis α' in the conventional type platform mechanism part is made of channel steel, being susceptible to a torsion moment, and by providing a torque tube 5 to bear the torsion moment, the chassis α has been reinforced. As the torque tube 5, a circular steel pipe provides a member having the highest strength, however, if a circular steel pipe is used as a torque tube 5 in this case, it presents problems of workability and vertical load bearing capacity, thus it is an optimum solution to utilize a long square pipe.

If a long square pipe is used as a torque tube 5, the strain and the load imposed on the four corners of the rectangular frame can be reduced to one fifth or less and the strength can be increased five times or more without the need for greatly increasing the dimensions and the weight, as compared to the channel steel which has conventionally been used in general.

Figure 2A:
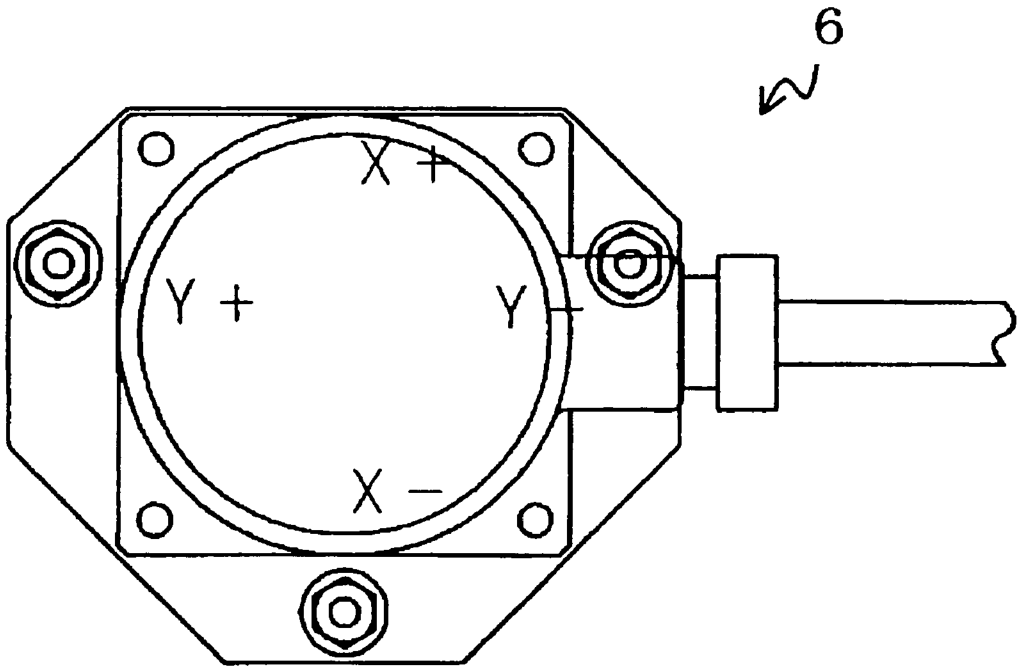
FIG. 2 (*a*), FIG. 2 (*b*), and FIG. 2 (*c*) are explanatory drawings for an angle sensor pertaining to an example of apparatus of the present invention, FIG. 2 (*a*) being a plan view, FIG. 2 (*b*) a side view, and FIG. 2 (*c*) a front view.
Figure 2B:
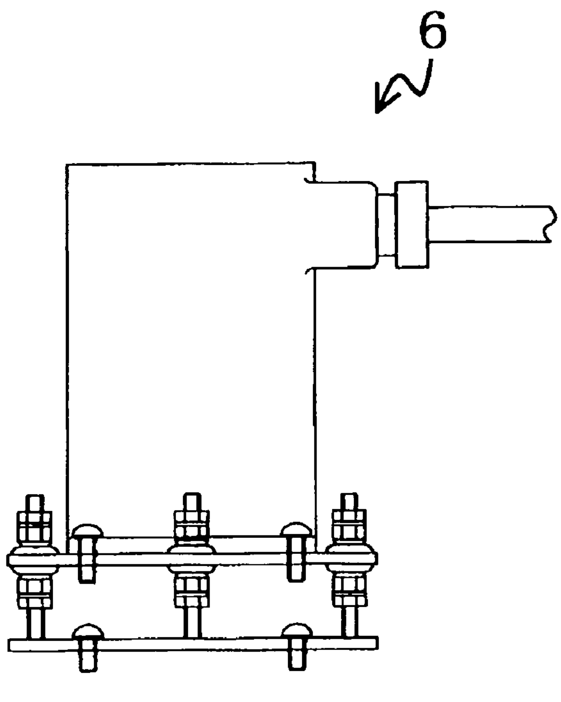
Figure 2C:
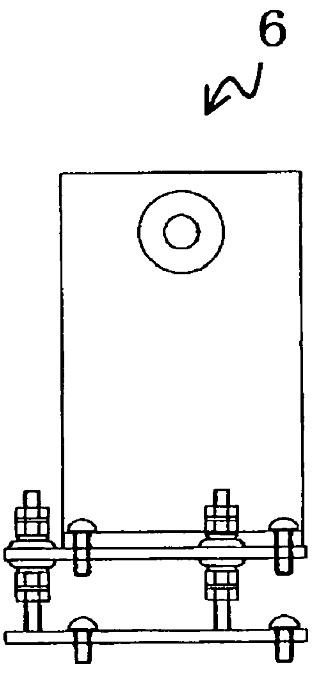
Figure 3:
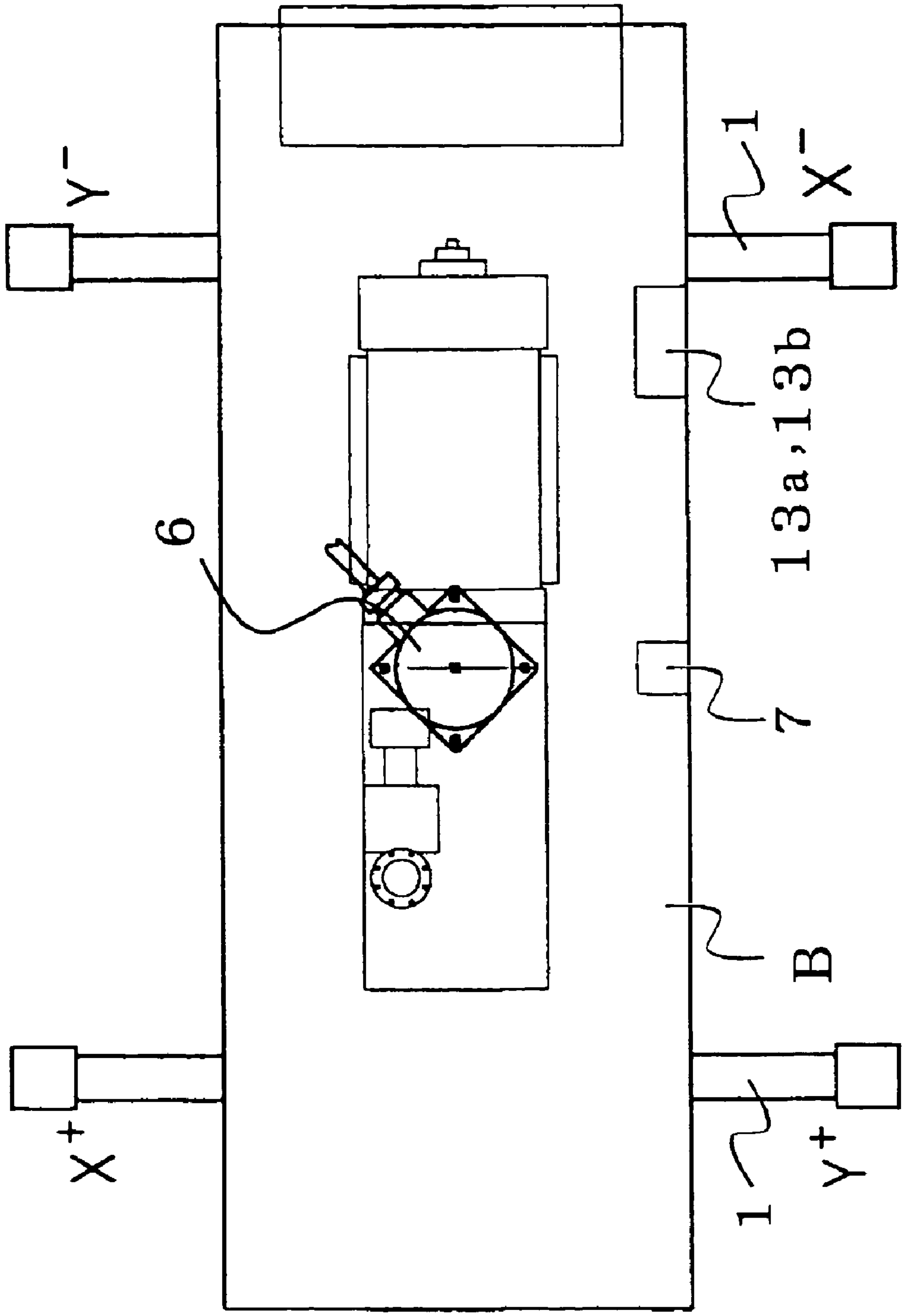
FIG. 3 is a perspective front view illustrating the mounting location for the angle sensor in a mobile power generating apparatus, or the like, that pertains to an example of apparatus of the present invention.
Figure 4:
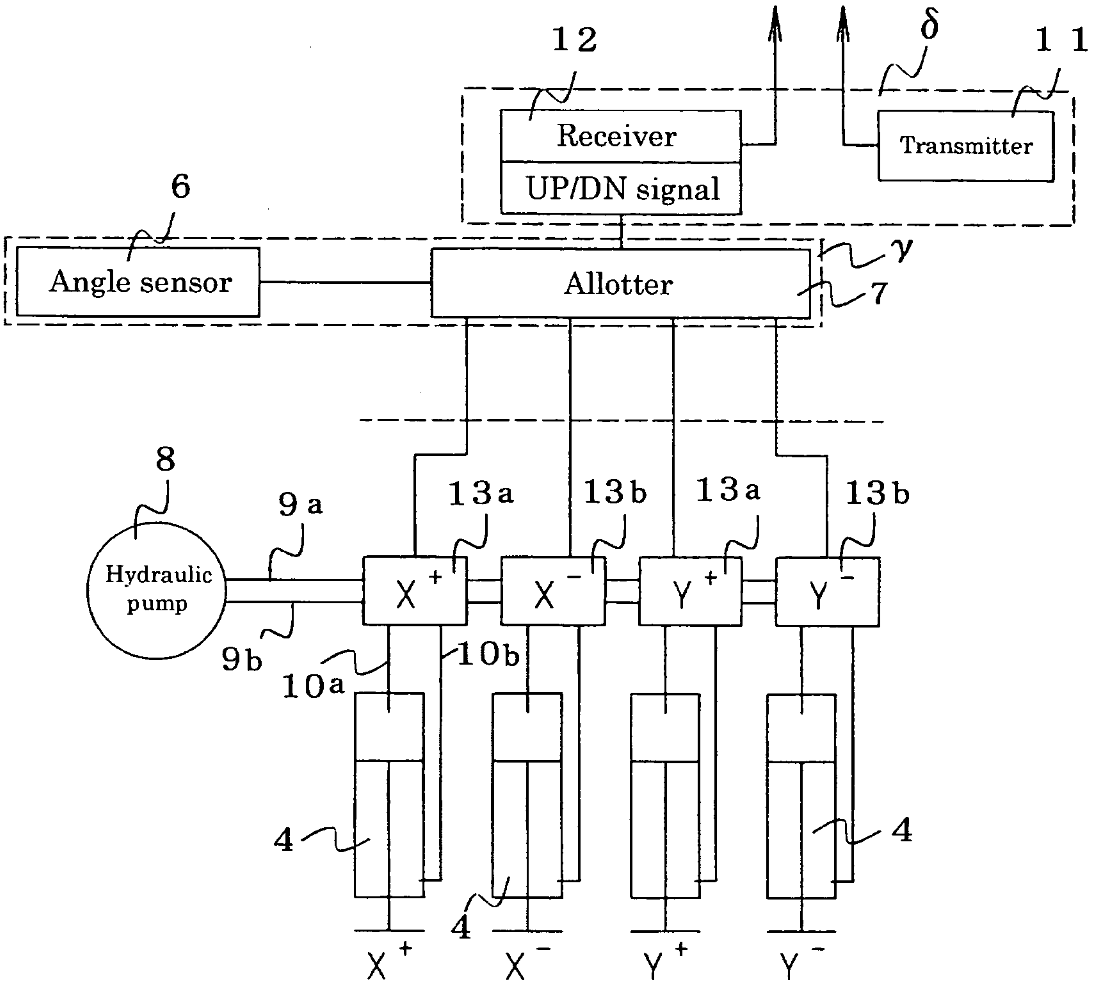
FIG. 4 is a configuration diagram for a drive control circuit comprising an automatic leveler essentially consisting of an angle sensor and an allotter pertaining to an example of apparatus of the present invention.

With reference to FIG. 4, the drive control circuit for the automatic lift/lower type platform controlling apparatus A that is used for performing the inclination correction will be described. FIG. 2 (*a*), FIG. 2 (*b*), and FIG. 2 (*c*) show an angle sensor to be used for the inclination correction, FIG. 2 (*a*) being a plan view, FIG. 2 (*b*) a side view, and FIG. 2 (*c*) a front view, and FIG. 3 is a perspective front view illustrating the mounting location for the angle sensor.

Figure 6A:
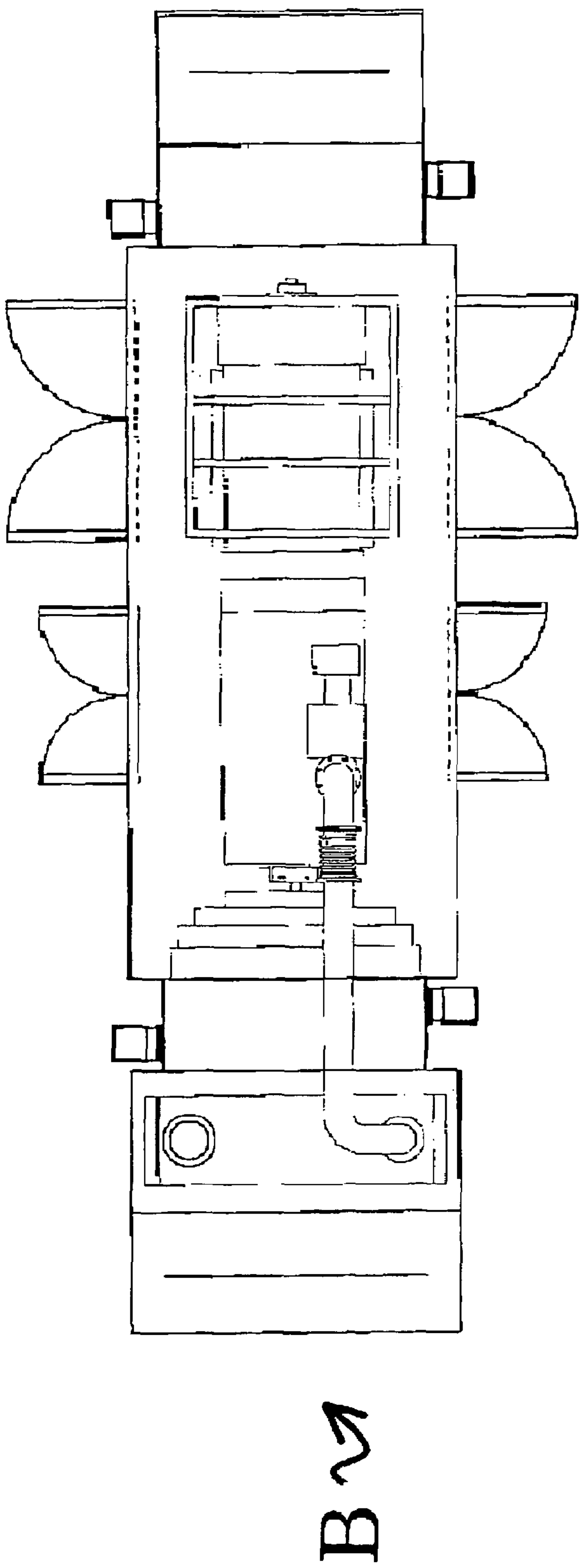
FIG. 6 (*a*) and FIG. 6 (*b*) are appearance drawings of a mobile power generating apparatus, FIG. 6 (*a*) being a plan view while FIG. 6 (*b*) a right side view.
Figure 6B:
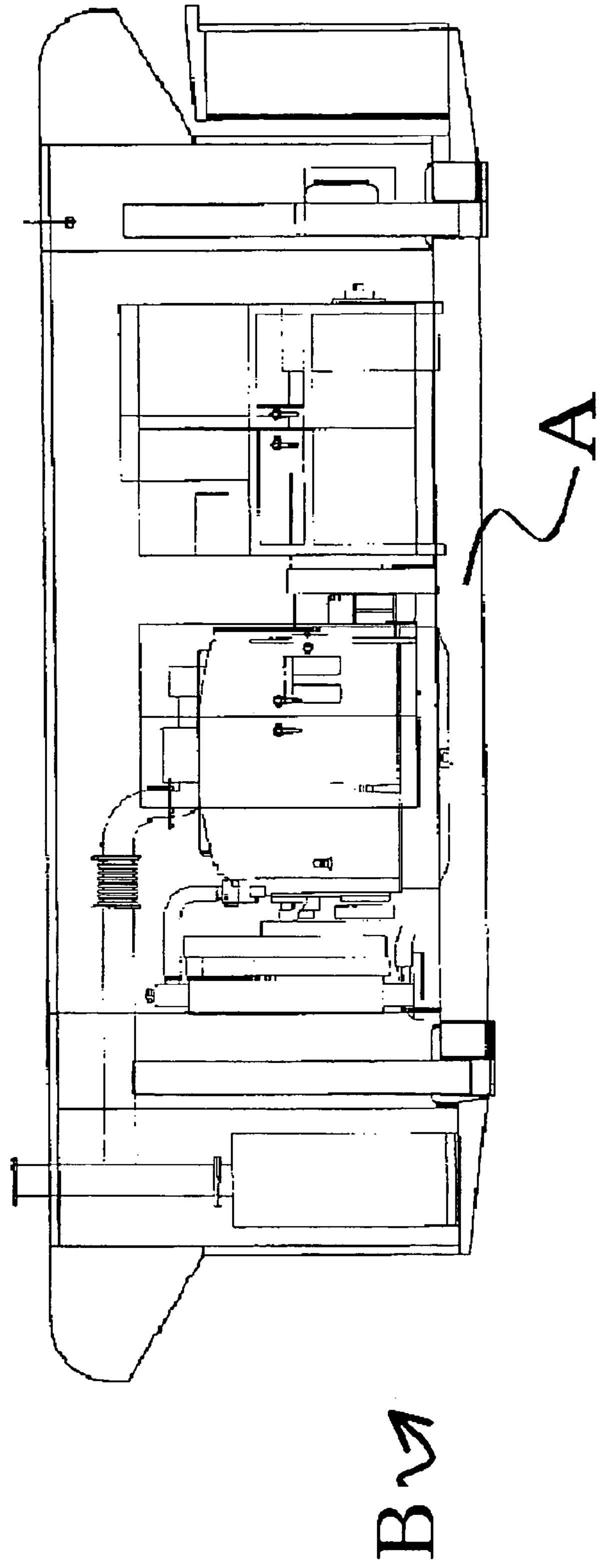

To the mobile power generating apparatus B, or the like, as shown in FIG. 6 (*a*) and FIG. 6 (*b*), an automatic leveler γ essentially consisting of an angle sensor 6 for determining the angles for the jacks 4 for the automatic lift/lower type platform controlling apparatus A and an allotter 7 corresponding to the jacks 4 at the four corners of the chassis α is mounted in order to detect the inclination of the apparatus B, or the like, that is generated by the automatic lifting/lowering operation, and maintain the level while automatically correcting the inclination for carrying out automatic lifting and automatic lowering of the mobile power generating apparatus B, or the like.

In other words, in order to automatically adjust the levelness by using the outriggers β in the chassis α after the jacks 4 in the outriggers β having been upped, the automatic leveler γ detects the inclination angles in the diagonal X and Y directions for the jacks 4 in the chassis α by means of the angle sensor 6 installed at the center of the bottom of the mobile power generating apparatus B, or the like, to compare the detected values with the setting angles by means of the allotter 7, and output ON/OFF open-close signals for eliminating the deviation of true level to the respective jacks 4 such that the inclination angle for the chassis α is zeroed, outputting a level output signal when the deviation of true level is within ±1 deg or reduced to within ±1 deg. In addition, when the angle for the chassis α is increased to over ±6 deg during operation, the automatic leveler γ outputs an alarm signal.

As shown in FIG. 3, the angle sensor 6 is mounted in the central portion of the mobile power generating apparatus B, or the like, and the angle sensor 6 communicates with the jacks 4, X+, X−, Y+, and Y−, at the four corners, respectively, through a hydraulic pump 8, and parallel hydraulic circuits 9*a*, 9*b*, 10*a*, 10*b* for supply and return. In lifting, when the deviation of true level exceeds +1 deg, an OFF signal is given to interrupt the lifting of the higher portion.

In addition, as shown in FIG. 4, to the allotter 7, a wireless control apparatus 6 essentially consisting of a transmitter 11 for wireless remote control that provides a control operating apparatus for allowing the operator to carry out operation control wirelessly, and a receiver 12 which provides a remote control operating apparatus for allowing remote control operation.

(Example of Method)

Figure 5A:
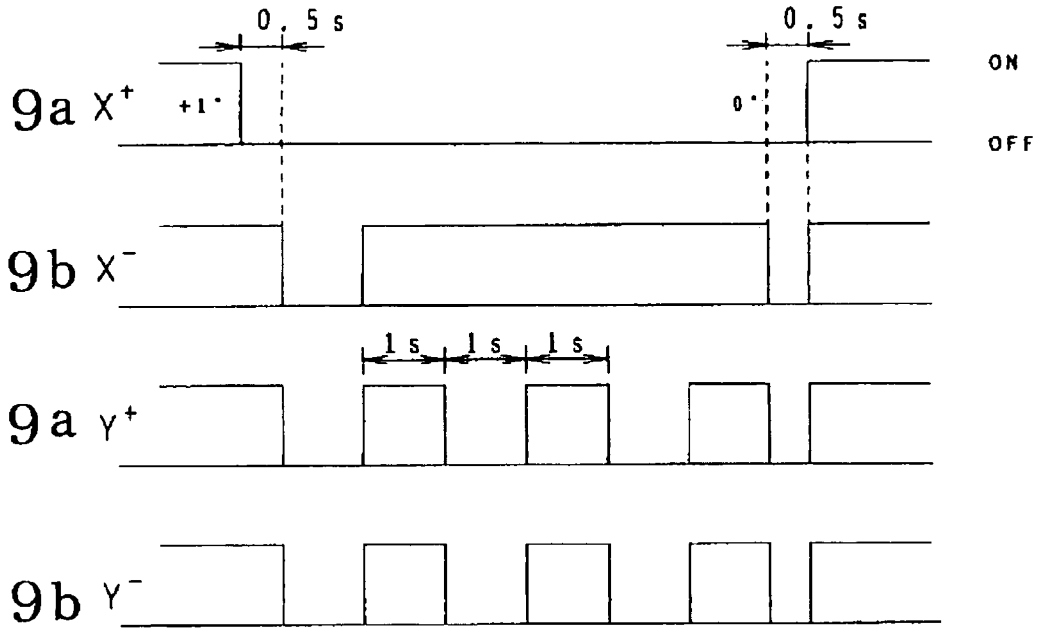
FIG. 5 (*a*) and FIG. 5 (*b*) are diagrams illustrating the respective operation of solenoid directional control/open-close valves pertaining to an example of apparatus of the present invention, FIG. 5 (*a*) illustrating the point displacement of a jack, while FIG. 5 (*b*) illustrating the line displacement of two jacks.
Figure 5B:
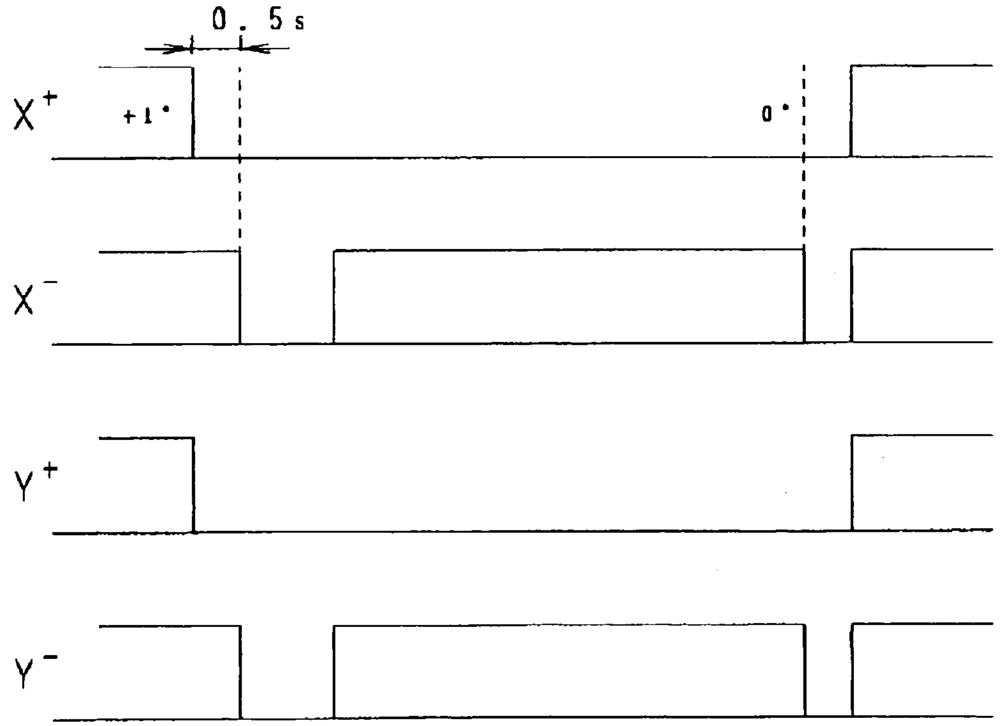
Figure 7A:
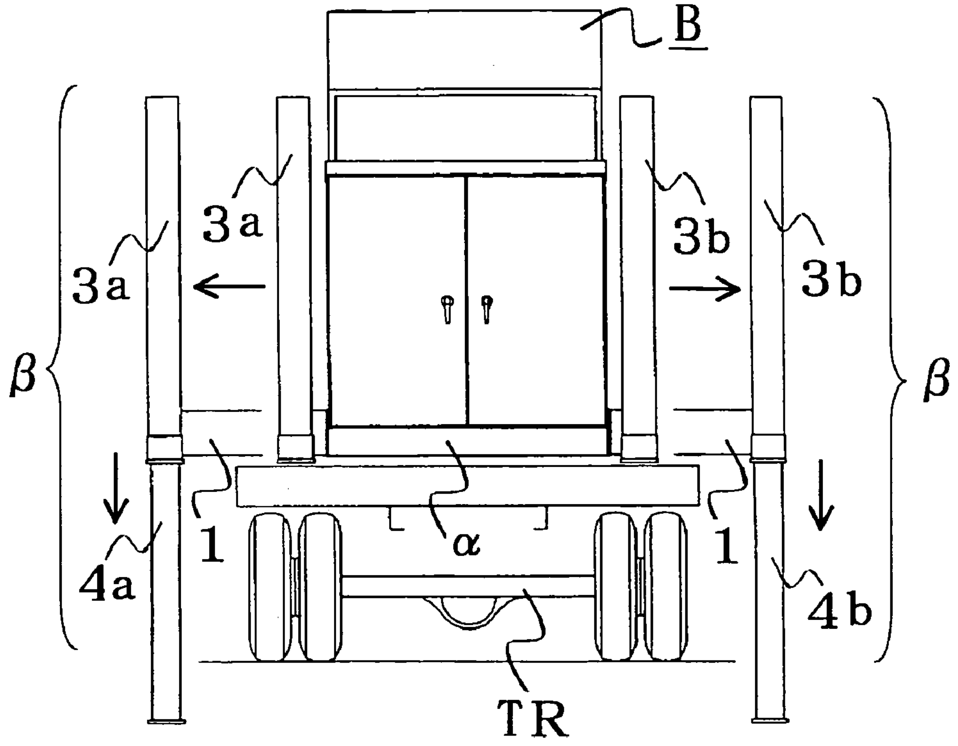
FIG. 7 (*a*) is an explanatory drawing illustrating the method of loading of a mobile power generating apparatus onto the cargo truck load-carrying platform with the outriggers in the automatic lift/lower type platform controlling apparatus pertaining to an example of apparatus of the present invention being extended, giving a back view.
Figure 7B:
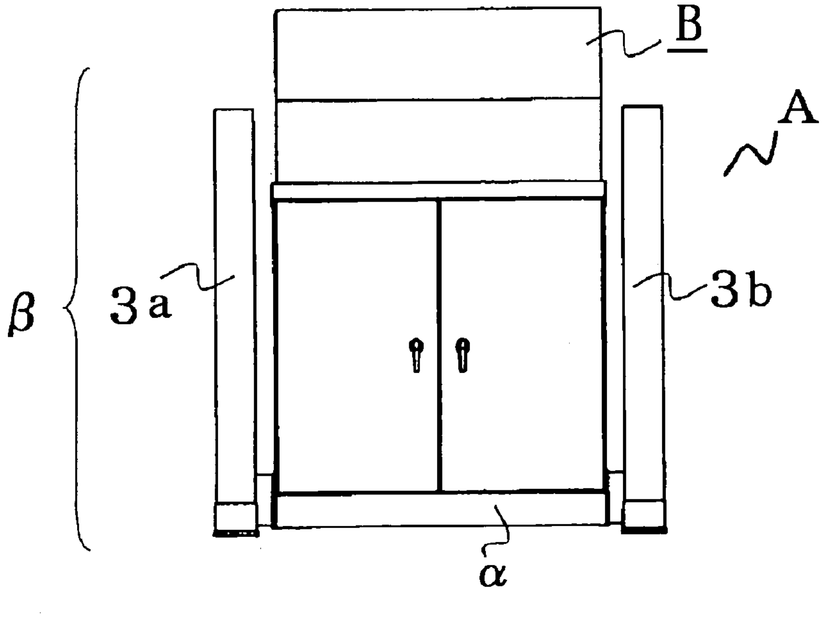
Figure 8A:
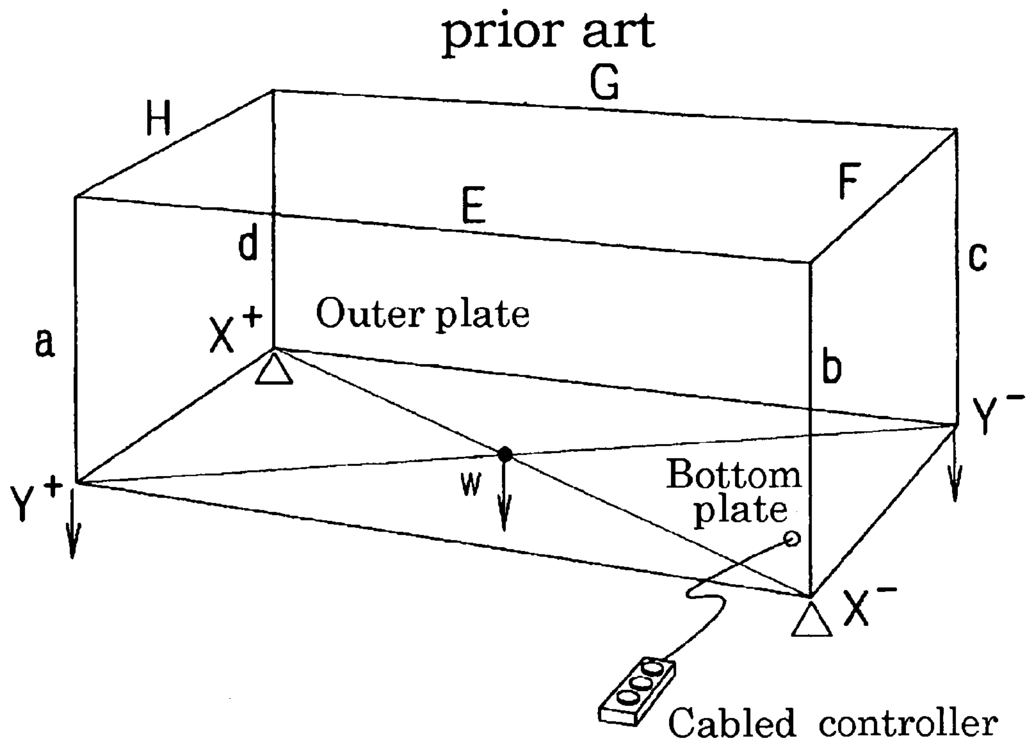
FIG. 8 (*a*) and FIG. 8 (*b*) are explanatory drawings illustrating the tension imposed on the container outer plates and bottom plate for reinforcing the conventional automatic lift/lower type platform controlling apparatus, FIG. 8 (*a*) giving an appearance drawing, and FIG. 8 (*b*) a front view.
Figure 8B:
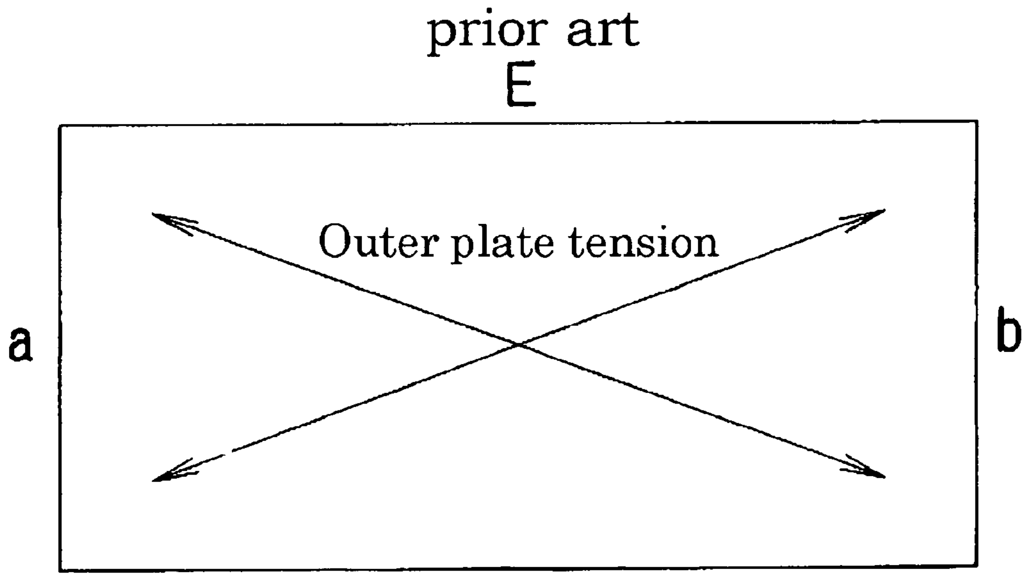
Figure 9A:
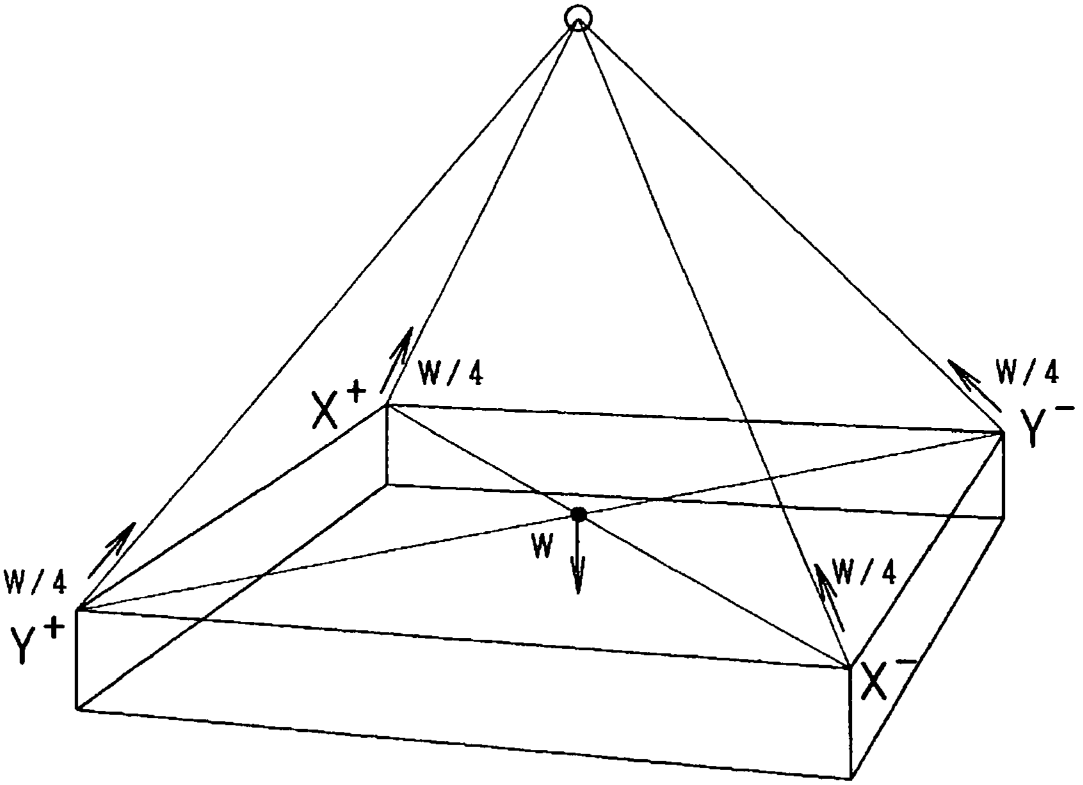
FIG. 9(a) prior art
FIG. 9 (*a*) and FIG. 9 (*b*) are explanatory drawings illustrating the loading on the conventional automatic lift/lower type platform controlling apparatus, FIG. 9 (*a*) being a drawing for explaining the four-point suspended load with a crane, while FIG. 9 (*b*) a drawing for explaining the two-point supported load on jacks.
Figure 9B:
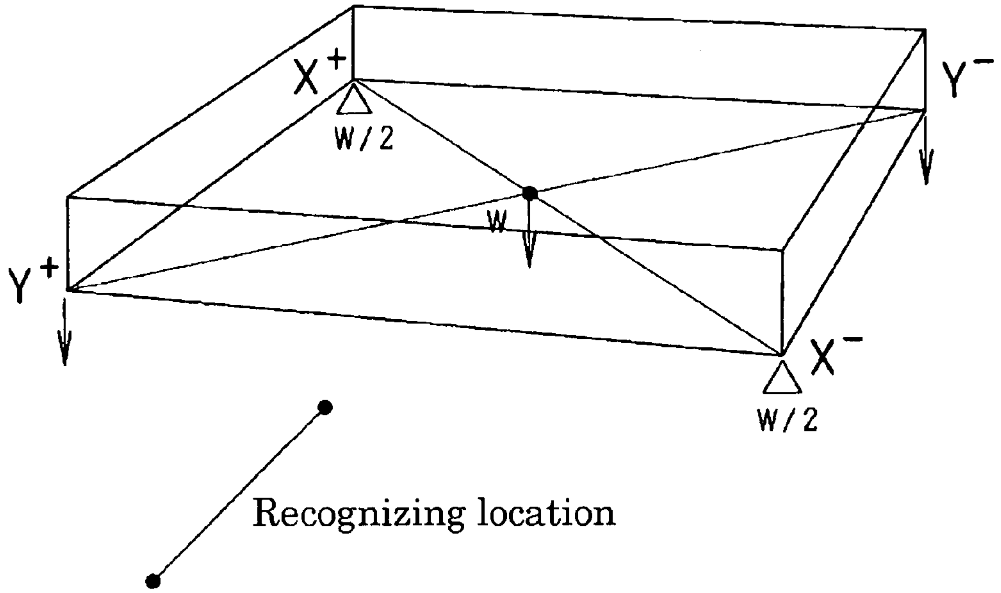
FIG. 9(b) prior art
Figure 10:
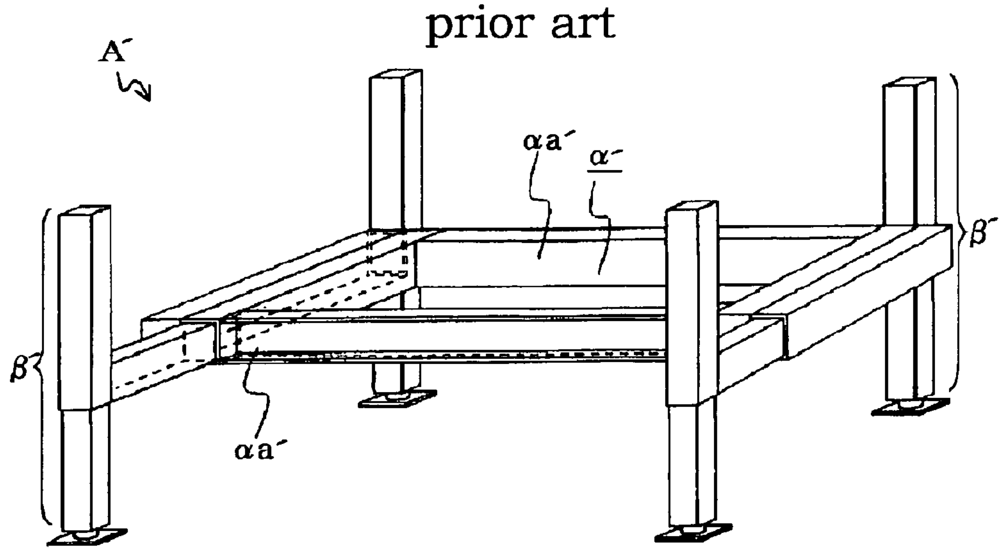
FIG. 10 prior art

Next, with reference to FIG. 4, FIG. 5 (*a*), FIG. 5 (*b*) and FIG. 7 (*a*), and FIG. 7 (*b*), the automatic lifting/lowering operation in the present example of method that is carried out while the inclination correction being performed will be described. FIG. 4 is a diagram also illustrating the flow of open-close signals from the angle sensor 6 and the allotter 7 in the drive control circuit; FIG. 5 (*a*) and FIG. 5 (*b*) are diagrams illustrating the respective operation of two pairs of solenoid directional control/open-close valves 13*a*, 13*b*, right and left, FIG. 5 (*a*) illustrating the point displacement of a jack, while FIG. 5 (*b*) illustrating the line displacement of two jacks 4; and FIG. 6 (*a*) and FIG. 6 (*b*) are perspective drawings of the mobile power generating apparatus B, FIG. 6 (*a*) being a plan view while FIG. 6 (*b*) a right side view. FIG. 7 (*a*) is an explanatory drawing illustrating the method of loading onto the load-carrying platform of a cargo truck TR with the outriggers β being extended, giving a back view; and FIG. 7 (*b*) is a back view of the mobile power generating apparatus B loaded on the automatic lift/lower type platform controlling apparatus.

With the present example of method, as shown in FIG. 7 (*a*), when the mobile power generating apparatus B, or the like, is to be removed from the working site for loading it onto the cargo truck TR, the operator causes the vertical inner cases 4*a*, 4*b* in the outriggers β to be extended downward in order to lift the chassis α in the automatic lifting/lowering platform mechanism together with the power generating apparatus B, or the like, to the position where the load-carrying platform of the cargo truck TR can be inserted to under the chassis α which is integrated with the power generating apparatus B, or the like, or on which the power generating apparatus B, or the like, is loaded. (When the mobile power generating apparatus B, or the like, is to be installed onto the working site from the cargo truck TR, the operation mentioned herein is correspondingly applied.)

In this way, when the operator depresses the pushbutton switch for lifting on the transmitter 11 for wireless remote control in the remote control apparatus, the vertical inner cases 4*a*, 4*b* in the outriggers push up the mobile power generating apparatus B, or the like, on the chassis α. In this case, the angle sensor 6 detects the angles in the directions of X+, X−, Y+, and Y− corresponding to the jacks 4 located closer to the four corners of the mobile power generating apparatus B, or the like.

For example, as shown in FIG. 5 (*a*), when the jack for X+ produces a point displacement, resulting in the deviation angle exceeding +1 deg, the jack for X+ is stopped with the jacks for Y+ and Y− being lifted at half speed, and the jack for X− being lifted at full speed for restoring the levelness. Thereafter, the four jacks resume the full-speed lifting. The switching-over time can be set at 0.5 sec or so.

Next, as shown in FIG. 5 (*b*), when the two jacks for X+ and Y+ produce a line displacement, resulting in the deviation angle exceeding +1 deg, the jacks for X+ and Y+ are stopped, and the jacks for X− and Y− are lifted at full speed to restore the levelness.

As described above, the inclination detection signals for the four points that are produced by the angle sensor 6 are introduced into the allotter 7, which allots the ON/OFF open-close signal to the combination of the right and left solenoid directional control/open-close valves 13*a*, 13*b* in accordance with the displacement form (point of line) to cause the four jacks 4 for X+, X−, Y+, and Y− to follow the control, and thus the chassis α in the automatic lifting/lowering platform mechanism part can be substantially continuously lifted, while even a slight inclination of the chassis α in the diagonal directions and at the four sides thereof being corrected.

Also in lowering, when a displacement is produced, resulting in the deviation angle exceeding −1 deg, the level correction is automatically carried out, the control for stopping the pertinent jack 4 for X+, X−, Y+, or Y− being performed, which allows the mobile power generating apparatus B, or the like, to be lowered safely with the hydraulic circuit open-close shock load being held to a minimum.

In the present invention, starting/switching-over of automatic lifting and automatic lowering of the jacks 4 is performed by wireless control using two channels. The transmitter 11 for wireless remote control utilizes only the two channels for lifting and lowering, and the detection and correction of the inclination is automatically performed.

EXAMPLE

For the automatic lifting/lowering platform mechanism part to be with the mobile power generating apparatus B, or the like, development of a unique chassis α which can withstand the load for two-point support without the need for increasing the weight has been presented as a problem to be solved.

1) Herein, reinforcement of the chassis α will be described in detail.

Because the chassis α' using the conventional type frame structural material αa' made of channel steel is susceptible to a torsion moment, the conception has been transformed to adopt the concept of "torque tube" for bearing the torsion moment. For a given weight per unit length, a circular steel pipe provides a material having the highest strength for use as a torque tube 5, however, if the circular steel pipe is used, there arise difficulties of insufficient vertical load bearing capacity and workability, and it has been found that these difficulties can be solved by using a long square pipe as a torque tube 5.

The values of "y ratios" for the three elements of the section performance, i.e., the geometrical moment of inertia I, the section modulus Z, and the radius of gyration i, of the "square steel pipe" which is provided with approximately the same section modulus Zx as that of the "channel steel" for a 6600 V, 625 kVA diesel power generating apparatus weighing 10 t (in total, including the bonnet weight), as well as an equivalent unit weight and load bearing capacity to that channel steel are extremely great as "5.95 for Iy, 5.30 for Zy, and 2.41 for iy", which means that the Iy value contributing to the torsion strength for the above-mentioned square steel pipe is approx. six times as great as that for the above-mentioned channel steel, and the Zy value contributing to the strain strength and the strength of the termination four corners is approx. five times as great.

These values mean that the strengths can be increased without the need for increasing the weight of the main structural materials and the reinforcements, and the problems caused by the torsion can be eliminated.

TABLE 1

| | | General structural square steel pipe | Channel steel | y ratio | |
|---|---|---|---|---|---|
| Dimensions | | 250 × 150 × 6 | 250 × 90 × 9 | | |
| Unit weight, kg/m | | 35.8 | 34.6 | | |
| Sectional area, $cm^2$ | | 45.63 | 44.07 | | |
| Geometrical moment | lx | 3890 | 4180 | | |
| of inertia, $cm^4$ | ly | 1770 | 294 | 5.95 | 0.166 |
| Section modulus, | zx | 311 | 334 | | |
| $cm^3$ | zy | 236 | 44.5 | 5.30 | 0.188 |
| Radius of gyration, | ix | 9.23 | 9.74 | | |
| cm | iy | 6.23 | 2.58 | 2.41 | 0.414 |

The square steel pipe can bear a torsion moment, in addition to that it has the same vertical load carrying capacity as that of the channel steel for a given unit weight (FIG. 1).

The adoption of the above-mentioned torque tube 5 has provided the following effects:

(i) The square steel pipe has eliminated the possibility of the chassis α having a torsion.

(ii) The need for reinforcing the structural materials, the outer plates, and the bottom plate is eliminated, and thus the increase in weight can be suppressed.

(iii) The problems of an increase in vibration during operation due to the misalignment of the engine with the synchronous generator, or the like, and resulting damage to the vibration absorbing rubber, and the like have been solved, which has improved the maintenability.

(iv) The possibility of the joint waterproofing material on the outer plate panel being peeled off, resulting in rainwater entering the interior, and that of the door being deformed has been eliminated.

2) Next, the inclination correction by the automatic leveler γ will be described in detail.

As the inclination of the mobile power generating apparatus B, or the like, is increased, the hydraulic circuit open-close shock load is also increased, and in addition, the pipe line resistance which varies depending upon the length between the hydraulic cylinder for the respective jacks 4 and the solenoid directional control/open-close valve 13*a*, 13*b* in the parallel hydraulic circuits 9*a*, 9*b*, 10*a*, 10*b*, and the shift of the load between jacks 4 toward the inclined side tend to accelerate the inclination.

The machine side operation of the conventional automatic lifting/lowering platform apparatus A' has been performed by finding the lower jack(s) of the four jacks 4 on the basis of the visual determination of the levelness, and adjusting the levelness of the pertinent jack(s) with the selection of one or more of the eight valves. The operation has been time-consuming, and the level on the side which cannot be viewed from the position of the operator has sometimes been higher. The higher the degree of inclination, the greater the possibility of the power generating apparatus B, or the like, being overturned, resulting from a "misoperation from the impatience for rapid correction", and the possibility that the operator, if he is close to the machine, is injured by the overturned machine have been given.

The solution to these problems by the present invention is that which has introduced the concept of the automatic leveler γ which assures faster and more accurate angle detection than the visual method, and eliminates the possibility of misoperation.

The angle sensor 6 substantially corresponds to the jacks 4 at the four corners for X+, X−, Y+, and Y−, and in lifting, when the deviation of true level exceeds +1 deg, an OFF signal is issued to interrupt the lifting of the higher portion.

In the present invention, when the jack for X+ produces a point displacement, resulting in the deviation angle exceeding +1 deg, the jack for X+ is stopped with the jacks for Y+ and Y− being lifted at half speed, and the jack for X− being lifted at full speed for restoring the levelness. Thereafter, the four jacks resume the full-speed lifting. The switching-over time can be set at 0.5 sec or so. When the two jacks for X+ and Y+ produce a line displacement, resulting in the deviation angle exceeding +1 deg, the jacks for X+ and Y+ are stopped, and the jacks for X− and Y− are lifted at full speed to restore the levelness. As described above, the inclination detection signals for the four points, i.e., the X+, X−, Y+, and Y− directions, are introduced into the allotter 7, which allots the ON/OFF open-close signal to the combination of the solenoid directional control/open-close valves 13*a*, 13*b* in accordance with the displacement form (point or line) to cause the four jacks 4 to follow the control, and thus the chassis α can be substantially continuously lifted, while even a slight inclination of the chassis α in the diagonal directions and at the four sides thereof being corrected (FIG. 2 to FIG. 5)

In lowering, when a displacement is produced, resulting in the deviation angle exceeding −1 deg, the level correction is automatically carried out, the control for stopping the pertinent jack 4 being performed, which allows the mobile power generating apparatus B, or the like, to be lowered safely with the hydraulic circuit open-close shock load being held to a minimum. The mobile power generating apparatus B, or the like, is lifted or lowered simply by applying either lifting or lowering open-close signal to the allotter 7 (the conventional system has required selection of one or more of the eight different signals).

When the chassis α uses the torque tube 5, and thus is free from torsion, the automatic leveler γ having a high accuracy can effectively function, and an effect of mutual cooperation between both can be obtained. However, if the concept of the level sensor is introduced into the conventional chassis α' exhibiting a large torsion, the error is increased, and thus said problems cannot be overcome.

The adoption of the above-mentioned automatic leveler γ has provided the following effects:

(i) The power generating apparatus B, or the like, can be substantially continuously lifted and lowered while the levelness thereof being maintained.

(ii) The inclination is reduced.

(iii) The operation can be made more rapidly and precisely.

(iv) The inclination in operation can be minimized, thus the degree of rocking of the engine and synchronous generator, or the like, on the vibration absorbing rubber mounts is also reduced to a minimum, resulting in the misalignment, the damage, such as that to the vibration absorbing rubber mounts, and the like, being minimized.

(v) The possibility of the joint waterproofing material on the outer plate panel being peeled off, resulting in rainwater entering the interior, and that of the door being deformed can be eliminated, as with the torque tube 5.

(vi) The volume required of the hydraulic cylinder for the jack 4 can be reduced.

(vii) The fuel consumption of the hydraulic pump 8 can be reduced.

3) The wireless control apparatus δ will be further described in detail.

Wireless operation of the solenoid directional control/open-close valves 13*a*, 13*b* in the hydraulic circuits 9*a*, 9*b*, 10*a*, 10*b* is not novel, however, the conventional system has used eight channels for operation of the four jacks 4. On the other hand, the system of the present invention has made it possible to wirelessly operate all the four hydraulic cylinders with only the two channels for lifting and lowering.

The cable control and the conventional system of wireless remote control can both eliminate the possibility that the operator might be injured by the power generating apparatus B, or the like, even if overturned, as long as the operator is remote from the machine to operate it, and make it easier for the operator to look around the surroundings for confirming the safety of himself and the surroundings, and recognizing the levelness, however, the cable control requires a long cable in order to assure a sufficient range of view, and involves the possibility that, when the operator visually carries out the level correction while looking around the surroundings, the operator might cause the cable to be engaged with the leg of the jack 4, and to be pinched and crushed during the operation thereof, or that the cable might be repeatedly twisted, resulting in a wire breakage in the connector leading to no-operation, a misoperation or a machine runaway, which is the most hazardous, due to the broken wire being contacted with some other circuit. On the other hand, the wireless remote control of the conventional system is free from the problems specific to the cable control, however, it uses eight switches for operation, and thus, if the operator concentrates his attention to the bothersome operation of the switches, he cannot pick his steps, which leads to his overturning due to stumbling over some other piece of equipment on the working site or an accident resulting in injury, such as the operator putting his foot through a nail, thus the wireless remote control of the conventional system has been an apparatus which will not allow sufficient attention to the safety of the operator himself and the surroundings.

The wireless remote control of the system of the present invention differs from that of the conventional system in that the combination of said automatic leveler γ with the wireless operation allows lifting and lowering to be performed with only two switches rather than the conventional system eight switches for the four jacks 4. The operator has been released from the check for levelness and the selection of one or more of the eight switches for the four jacks 4, resulting in the operator being able to concentrate on the safety of the surroundings and himself, and now an apparatus which allows sufficient attention to the safety of the operator himself and the surroundings has been realized. The adoption of the wireless remote control of the above-mentioned system of the present invention has provided the following effects:

(i) Confirmation of the surroundings for safety has been made easier to be performed.

(ii) The possibility that the operator might be injured by the overturned machine is eliminated.

As described above, by combining the angle detector 6, the allotter 7, and the transmitter 11 for wireless remote control, the operability, the safety, and the durability have been greatly improved, with the problems encountered with the conventional apparatus having been solved, the weight reduced, the safety improved, and the cost substantially reduced. Further, if the foot plates for the vertical inner cases 4*a*, 4*b* are replaced with rotatable and reorientable stopper-equipped casters incorporating a drive mechanism, the chassis α can be moved and reoriented to some extent on the installation site.

Hereinabove, the embodiments (the example of apparatus, and the example of method), and the EXAMPLE of the present invention have been described, however, the present invention is not always limited to the above-described means and method, and may be altered or changed as appropriate within the spirit and scope of the present invention as defined by the attached claims.

What is claimed is:

1. An automatic lifting and lowering controlling method for mobile power generating apparatus, wherein in an automatic lifting/lowering operation for installation or removal of a mobile power generating apparatus on or from a desired site, an automatic lift/lower type platform controlling apparatus on which the mobile power generating apparatus is loaded, or which incorporates the mobile power generating apparatus in the automatic lift/lower type platform controlling apparatus itself has a plurality of automatic lifting and lowering means, and when, during the operation of the automatic lifting and lowering means, the inclination of said mobile power generating apparatus is detected by automatic leveler means provided thereon, the operation of the respective automatic lifting and lowering means is automatically adjusted to keep the mobile power generating apparatus level, while the mobile power generating apparatus being automatically lifted or automatically lowered to a desired level, in a starting/switching-over operation for automatic lifting or automatic lowering of the mobile power generating apparatus, all of said plurality of automatic lifting and lowering means are collectively wirelessly remote controlled, said automatic leveler means essentially comprises a combination of an angle sensor for inclination correction, and an allotter for receiving a signal from the angle sensor to make ON/OFF control of the automatic lifting and lowering means for level adjustment operation, and as soon as the angle sensor detects that particular automatic lifting and lowering means or a particular set of automatic lifting and lowering means produces a deviation of true level that exceeds an allowable limit, stops the particular automatic lifting and lowering means, adjusting the operation of the other automatic lifting and lowering means or the particular set of automatic lifting and lowering means for restoring the levelness of said automatic lift/lower type platform controlling apparatus, then resuming the automatic lifting of automatic lowering.

2. The automatic lifting and lowering controlling method for mobile power generating apparatus of claim 1, wherein said automatic leveler means introduces open-close signals for the four points, right and left and front and rear, corresponding to said respective automatic lifting and lowering means into the allotter, and by causing said respective automatic lifting and lowering means to follow the control for level adjustment, automatically carries out the level correction of the inclination of said torque tube chassis in the diagonal directions and at the four sides thereof safely and with a minimum of shock in automatic lifting or automatic lowering.

3. The automatic lifting and lowering controlling method for mobile power generating apparatus of claim 1, wherein said automatic lifting and lowering means performs said automatic lifting/lowering operation, a torque tube being used as a frame structural material for a chassis in which the automatic lifting and lowering means is mounted in order to increase the torsion strength and the strain strength without the need for increasing the weight of reinforcement, and eliminate the problems arising from an inclination torsion or strain caused by a deviation in operation timing and speed between said respective automatic lifting and lowering means.

4. The automatic lift/lower type platform controlling apparatus for mobile power generating apparatus, wherein said automatic lift/lower type platform controlling apparatus is an apparatus for carrying out an automatic lifting/lowering operation for installation or removal of a mobile power generating apparatus on or from a desired site, comprising:

a chassis which is a platform on which the mobile power generating apparatus is to be loaded or which is integrated with the mobile power generating apparatus; a plurality of outriggers which are mounted on both sides of the chassis so as to be extended or drawn in in the horizontal direction in lifting or lowering operation;

an automatic leveler for automatically detecting the inclination of said mobile power generating apparatus in the front, rear, right, or left direction;

directional control/open-close valves provided in parallel pressure circuits for supply and return that connect between a single pressure source and the hydraulic cylinder in said respective outriggers for allowing selection of either supply or return circuit, and performing open-close operation on the level adjustment ON/OFF operation signal from said automatic leveler that corresponds to the respective outriggers.

5. The automatic lift/lower type platform controlling apparatus for mobile power generating apparatus of claim 4, wherein said automatic leveler essentially comprises:

a square angle sensor which is to be disposed at the center of the bottom of said mobile power generating apparatus with the four corners being oriented to the front, rear, right, and left directions of the mobile power generating apparatus respectively, and issuing inclination signals corresponding to said outriggers, respectively; and an allotter which receives the respective inclination signals from the angle sensor, and automatically allots a level adjustment ON/OFF operation signal to said respective directional control/open-close valves connected to the jacks incorporated in the outriggers, respectively.

6. The automatic lift/lower type platform controlling apparatus for mobile power generating apparatus of claim 5, wherein said allotter is functionally configured to issue a lifting/lowering command signal to said all directional control/open-close valves, being connected to a wireless control apparatus for selecting either of the two directions of lifting and lowering to operation-control said all jacks.

7. The automatic lift/lower type platform controlling apparatus for mobile power generating apparatus of claim 6, wherein said wireless control apparatus essentially comprises a combination of a transmitter having lifting and lowering two-channel operation switches and a receiver which receives a single channel signal from the transmitter to transmit either of the lifting and lowering signals to said allotter.

8. The automatic lift/lower type platform controlling apparatus for mobile power generating apparatus of claim 5, wherein for said chassis, a torque tube which is resistant to a torsion or strain generated in automatic lifting/lowering is adopted as a frame structural material.

* * * * *